Patented Apr. 28, 1931

1,802,645

UNITED STATES PATENT OFFICE

HERBERT C. GORE, OF SCARSDALE, AND CHARLES N. FREY, OF NEW YORK, N. Y., ASSIGNORS TO STANDARD BRANDS INCORPORATED, OF DOVER, DELAWARE, A CORPORATION OF DELAWARE

FOOD PRODUCT

No Drawing. Application filed October 24, 1929. Serial No. 402,316.

This invention relates to food products, and, more particularly, to a novel food product prepared by frying compressed yeast.

A general object of the invention is to provide a novel food product of a nutritious character having desirable flavor and good keeping qualities.

A more specific object of the invention is to provide a fried yeast product having a desirable texture, color and taste.

The invention accordingly comprises a product possessing the features, properties, and the relation of components which will be exemplified in the product hereinafter described and the scope of the application of which will be indicated in the claims.

During the development of this invention the inventors found that when an attempt was made to fry pure compressed yeast by the deep fat frying process crepitation was encountered, steam was generated on the inside of the unit being fried with such rapidity that portions of the interior burst through the crust with explosive violence, so that the resultant product not only was of an entirely different physical form from that of the unit which was originally dropped into the fat, but lacked those qualities of strength, color and flavor which are essential to a commercial product. The physical effect was similar to that which is experienced in dropping water into hot grease. Frying such yeast was impracticable.

These difficulties have been overcome in accordance with the principles of the present invention, by first admixing to the yeast about 10% of a filler, such as grain, starch, flour or potato meal, which prevents the crepitation, maintains the form of the unit being fried and improves the color, texture and flavor of the product.

The inventors have also found that the addition of about 1% of salt or other suitable plasmolyzing agent to the mixture prior to frying the same enables one to produce an unlimited number of shapes of final product, and also improves the flavor thereof.

The preferred method of carrying out the process is, therefore, to mix with compressed yeast about 10% of one of the fillers aforesaid and 1% of salt, allowing the salt to effect a slight plasmolysis, extruding the mixture through an orifice, or otherwise dividing the same to enable it to be readily fried, and then frying it in a deep fat, such as, for example, a hydrogenated oil, at a temperature of 130° to 160°, and preferably from 140° to 150° C.; thereafter the excess of fat is removed from the product of spinning it in a wire basket. The product thus formed is a nutritious food product having an attractive appearance, both from the standpoint of color and shape, a pleasant odor, and a flavor resembling that of fried meat.

If desired, without departing from the scope of the invention, other flavor-forming materials, such as for example, 10% of peanut butter, 10% of cheese, 10% of mashed potato or from 1 to 5% autolyzed or hydrolyzed yeast may be admixed with the product prior to frying with beneficial results.

Small amounts of sugar or sugar containing materials may also be used, in which case it has been found to be preferable to first cook the yeast to kill the cells and destroy the zymase and then add the sugar. This prevents an undesirable foaming which is otherwise encountered.

Although reference has been made above to frying in deep fat, it is to be understood that this is simply a preferred procedure and that any suitable method of frying may be used. The product after frying is plastic while hot and if desired, may be shaped at this stage instead of before frying.

Since certain changes may be made in the above product and different embodiments of the invention could be made without departing from the scope thereof, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent, is:

1. A method of preparing a novel food product, which comprises admixing about 10% of starchy material with compressed yeast and frying the mixture in deep fat until it is thoroughly cooked.

2. A method of preparing a novel food product, which comprises admixing about 10% of starchy material with compressed yeast and frying the mixture in deep fat at a temperature of from 140° to 150° C. until it is thoroughly cooked and has a light brown color.

3. A method of preparing a novel food product, which comprises admixing about 1% of a plasmolyzing agent and about ten per cent of a starchy material with compressed yeast, allowing plasmolysis to take place, shaping the mixture to a desired contour, and frying the mixture in deep fat until it is thoroughly cooked.

4. A method of preparing a novel food product, which comprises admixing about 1% of salt and about ten per cent of a starchy material with compressed yeast, allowing plasmolysis to take place, shaping the mixture to a desired contour, and frying the mixture in deep fat until it is thoroughly cooked.

5. A method of preparing a novel food product, which comprises admixing about 10% of starchy material and 10% of peanut butter with compressed yeast and frying the mixture in deep fat until it is thoroughly cooked.

6. A method of preparing a novel food product, which comprises admixing about 10% of starchy material and 1 to 5% of autolyzed yeast with compressed yeast and frying the mixture in deep fat until it is thoroughly cooked.

7. A method of preparing a novel food product, which comprises admixing about 1% of salt about ten per cent of a starchy material and a small amount of a flavoring material, such as peanut butter or autolyzed yeast to compressed yeast, allow plasmolysis to take place, shaping the mixture to a desired contour, and frying the mixture in deep fat until it is thoroughly cooked.

In testimony whereof we affix our signatures.

HERBERT C. GORE.
CHARLES N. FREY.